United States Patent
McLean

[11] 3,795,104
[45] Mar. 5, 1974

[54] GAS TURBINE CONTROL SYSTEM
[75] Inventor: Arthur P. McLean, Ann Arbor, Mich.
[73] Assignee: Ford Motor Company, Dearborn, Mich.
[22] Filed: Nov. 3, 1972
[21] Appl. No.: 303,585

[52] U.S. Cl............ 60/39.27, 60/39.28 R, 60/39.29
[51] Int. Cl. ............................................. F02c 9/10
[58] Field of Search.......... 60/39.27, 39.29, 39.28 R

[56] References Cited
UNITED STATES PATENTS

| | | | |
|---|---|---|---|
| 3,135,088 | 6/1964 | Holmes........................... | 60/39.27 X |
| 3,485,042 | 12/1969 | McLean........................... | 60/39.28 R |
| 3,486,329 | 12/1969 | McLean........................... | 60/39.28 R |
| 3,688,605 | 9/1972 | Amann.............................. | 60/39.29 |

*Primary Examiner*—Clarence R. Gordon

[57] ABSTRACT

A simple, low cost control system for a single shaft gas turbine engine in which steady state operation is controlled by movement of the stator vanes of a torque converter fixed to the compressor shaft, to load or unload the shaft; accelerations are controlled by controlling fuel flow as a function of engine temperatures and speeds; and engine starting and idle speed operations, as well as overtemperature operations are controlled by opening or closing a nozzle constituted by variable angle compressor inlet guide vanes.

12 Claims, 2 Drawing Figures

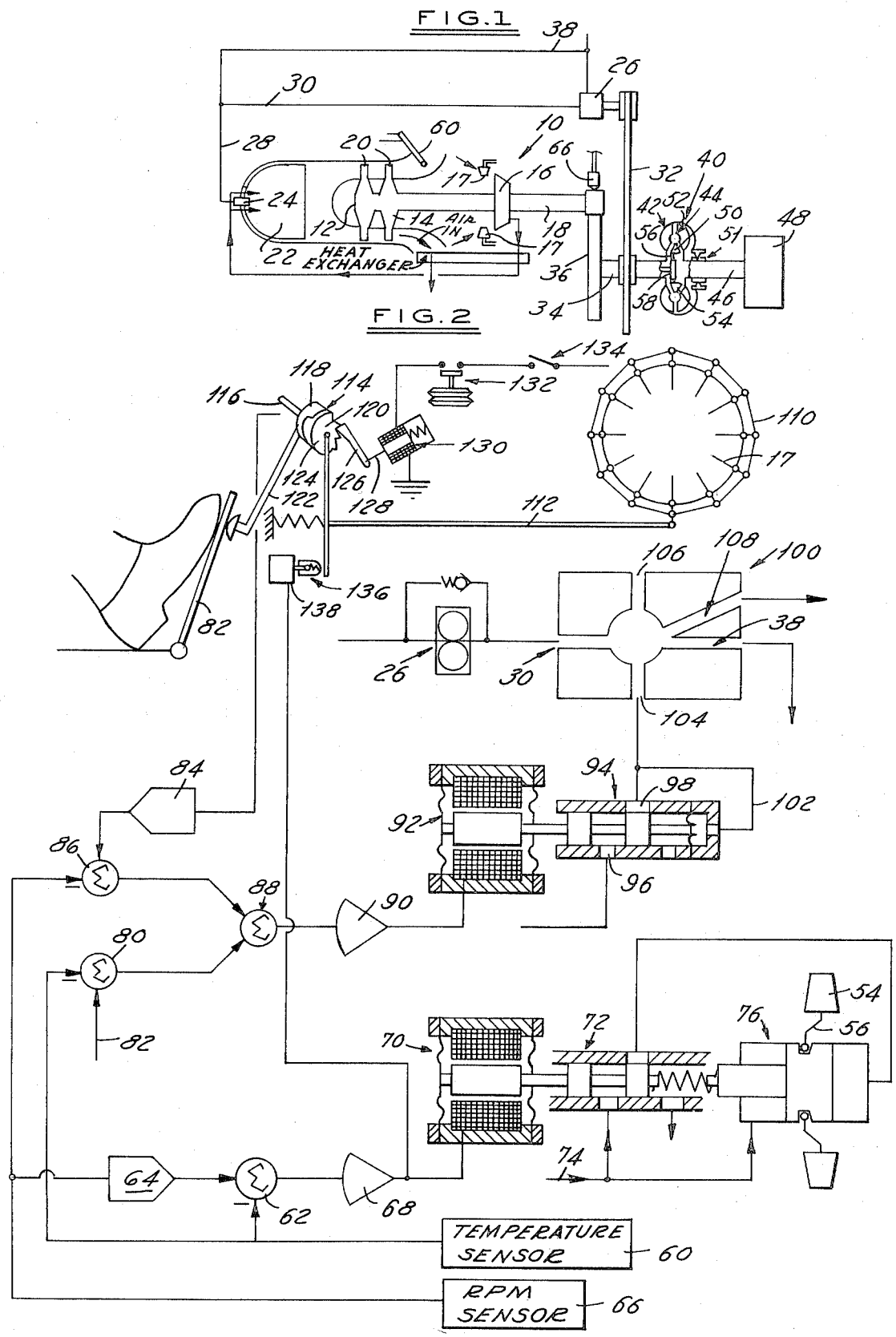

GAS TURBINE CONTROL SYSTEM

This invention relates, in general, to a motor vehicle type gas turbine engine. More particularly, it relates to a control system for a unishaft engine in which the compressor and power output turbine are both fixed to the same shaft.

The invention is an improvement over the unishaft control system shown in my U.S. Pat. No. 3,485,042, Gas Turbine Control System. The latter shows an engine with a hydraulic torque converter having movable stator vanes to load and unload the compressor shaft to control engine temperature level. It also contains a hydraulic fuel control sensitive to tubine operating temperature variances from a desired level to control fuel flow during acceleration and steady state operations.

The present invention utilizes control of movable torque converter stator vanes to control turbine operating temperatures for steady state operation. It controls fuel flow for acceleration purposes by measuring the differences between desired speed and actual speed and desired temperature levels and actual temperature levels. In addition, it provides movable compressor inlet guide vanes to control engine starting and idle speed operations. This is all done in a manner providing a low cost gas turbine engine control system.

The invention, therefore, relates to a control system whereby throttle position, engine speed, and engine temperature are used to control fuel flow, stator vane position, and inlet guide vane position in an optimum manner utilizing electronic logic and fluidic and hydraulic metering.

More specifically, steady state operation of the unishaft gas turbine engine is controlled by infinitely variably angled torque converter stator vanes to load or unload the compressor shaft to maintain the temperature at desired maximum levels within surge and metallurgical limits; acceleration of the engine is controlled by the accelerator pedal demanding a fuel flow schedule determined in accordance with temperature differentials between that called for and the desired upper limit and also the differential in speed between actual and that called for, to divert fuel flow from the fuel tank to the combustion chamber through a fluidic metering device; and, thirdly, engine idling speed and starting are controlled by opening or closing compressor inlet guide vanes, closing providing engine idling, with an override if the operating temperature becomes excessive, and a further override to start the engine with the vanes in an open position even though the accelerator pedal may be calling for idle speed operation.

It is an object of the invention, therefore, to provide a low cost control system for a motor vehicle type unishaft gas turbine engine.

It is another object of the invention to provide a unishaft gas turbine engine control system that includes movable torque converter stator vanes, a fluidic metering device to control fuel flow, and movable compressor inlet guide vanes to control air flow into the engine during idling and starting operations and during accelerations and periods of excessive temperature operation.

Other objects, features and advantages of the invention will become more apparent upon reference to the succeeding detailed description thereof, and by reference to the drawing illustrating a preferred embodiment thereof, wherein;

FIG. 1 illustrates schematically a single shaft gas turbine engine embodying the invention; and, FIG. 2 illustrates schematically a low cost control system embodying the invention.

FIG. 1 illustrates schematically a portion 10 of a single shaft gas turbine engine. Basically, the engine includes a pair of turbine wheels 12 and 14 and a compressor member 16 all fixedly mounted on a common shaft 18. The compressor and turbines are shown as being of the radial and axial flow types, respectively; however, it will be clear that they could each be of the other type, or both of the same type, as well as single or multi-staged, without departing from the scope of the invention.

The compressor in this case has a set of circumferentially spaced, movable inlet guide vanes 17 that are pivotally mounted in a known manner as a nozzle for closing down or opening the inlet to the compressor to control the airflow through it; that is, to provide more or less swirl to control the horsepower output by controlling the torque rather than the speed of the air through the inlet.

Turbine wheels 12 and 14 each include a plurality of circumferentially spaced blades 20 that project into the path of flow of and are rotated by the products of combustion from a combustion chamber 22. The combustion chamber includes the usual fuel nozzle 24 receiving a supply of fuel from a pump 26 through connecting lines 28 and 30. The fuel pump in this case is driven by a pulley and belt type drive 32 from shaft 18. Fuel pump 26 would have a capacity so as to always supply more fuel than is required by the system, so that the system is never starved. Accordingly, a fuel bypass line 38 is connected in parallel to supply line 28 so that fuel is normally bypassed back to the inlet of the fuel pump through a fluidic metering device shown in FIG. 2 to be described later.

Further details of construction and operation of the gas turbine engine per se are not given, other than the schematic illustrations in FIG. 1, since they are known and believed to be unnecessary for an understanding of the invention. Suffice it to say that the engine would include the usual diffuser section and heat exchangers common to an engine of this type for delivery of low temperature, high pressure compressor discharge air to the combustion chamber with a higher temperature, and for recapturing a portion of the waste heat of the exhaust gases to warm the compressor discharge air.

The engine shows a power reduction gearing 36 to an output shaft 34, which in this case serves as the power input to a hydraulic torque converter 40. The converter includes a pump or impeller member 42 secured for rotation with shaft 34, a turbine member 44 secured for rotation with the input member 46 of a vehicle gear box or transmission 48, and a variable angle stator or reaction member 50. The converter assembly also includes a one-way or overrunning clutch 51 of a known construction between the pump shell 52 and the turbine shaft 46. The clutch would include the usual sprags or rollers, and permit free rotation of pump 42 faster than turbine 44 in one direction, while locking up the pump and turbine at any attempt of the turbine to rotate faster than pump 42. This provides an engine braking effect to retard coasting of the vehicle in which the power plant is installed.

Stator 50, in this case, has an annular set of reaction blades 54 that are pivotally mounted by means of crank pin 56 on an annular hub 58. The hub is held against rotation by being connected in any suitable manner not shown to a stationary portion of the vehicle, but is movable circumferentially to adjust the angle or attitude of the stator blades from an initial position.

More specifically, the torque converter operates in a known manner by the circulation of fluid in a toroidal path from the pump to the turbine and back again through the reaction member. The latter serves to impart torque to the pump in an amount that varies from essentially zero to a maximum torque. Thus, a varying degree of load can be imposed on or taken off the pump member and shaft 34. This of course is transmitted through the reduction gearing 36 to shaft 18 to thereby load or unload the engine and compressor as a function of the position of the torque converter stator blades.

Having described the physical arrangement of the parts of the single shaft turbine, referring now to both FIGS. 1 and 2, it will be seen that basically there are three controls of the proposed control system. Movement of the stator vanes during steady state operation is used to maintain a selected speed and maximum operating temperature; secondly, a fluidic metering device is used to control fuel flow to the combustion chamber during vehicle acceleration demand so as not to exceed engine temperature and metallurgical limits; and thirdly, the compressor inlet guide vanes are movable between open and closed positions for starting and engine idling speed operations, and also during accelerations to provide the necessary airflow without excessive operating temperatures.

More specifically, consider first the control of the torque converter stator vane positions during steady state operation to maintain the speed selected without exceeding compressor surge and metallurgical temperature limits. As shown in FIG. 1, turbine inlet temperature is sensed by a suitable thermocouple or thermister indicated at 60. The temperature sensor is connected by wiring to an electronic comparator 62 having an additional input from a desired steady state temperature function generator 64. The latter is of a known speed responsive type providing an output signal force that varies with the speed of rotation of the engine shaft, as indicated by the rpm sensor 66, and is indicative of the desired change in temperature with each change in speed level to be a maximum and yet not provide compressor surge or exceed metallurgical temperature limits. Such a function generator, for example, is shown and described in U.S. Pat. No. 3,508,562.

The error or differential between the desired speed control temperature schedule and the actual temperature as indicated by comparator 62 is fed to an amplifier 68 to boost the weak signal. This signal is then fed to a solenoid 70 with an armature connected to a fluid pressure regulating valve 72. The valve in turn controls the supply of a hydraulic fluid from a suitable source 74 through the valve to a servo 76 connected to the crank arm 56 of the infinitely variable stator vanes 54. Accordingly, depending upon the level of the error signal force to the solenoid, the stator vanes will be moved in one direction or the other to load or unload the compressor shaft, as the case may be, to thereby control the output shaft temperature to maintain it at the level desired for the particular steady state operating speed. That is, if the temperature of the turbine rises above the safe limit, the signal sent to the solenoid 70 will move the stator vanes 54 to unload the compressor shaft and permit a faster speed operation, which will reduce the turbine temperature to the desired level. Simultaneously, the increased speed will, in a manner that will be described, reduce fuel flow so that the compressor speed will be returned to the chosen steady state operating level.

Now consider the control of speed by fuel flow. The same actual operating temperatures sensed at 60 is also supplied to a comparator 80 which has as its alternate input a desired acceleration temperature schedule signal 82. The latter provides a design temperature level for each level of acceleration of the engine so as not to provide excessive temperature levels. Yet it momentarily permits a temperature level above that which would normally provide compressor surge or exceed the engine metallurgical limits if operating under steady state conditions. As is known, the engine can momentarily withstand higher than normal temperature levels. Accordingly, all acceleration schedules generally provide for this higher than normal temperature attainment to provide the power output desired.

Concurrently, for acceleration purposes, depression of the engine accelerator pedal 82 by the vehicle operator controls a speed function generator 84 providing an output signal that varies in proportion to and is indicative of the desired speed level. The output of the function generator is compared electronically by a comparator 86 with the actual engine speed as determined by sensor 66. The differences between the two are supplied to a logic circuit indicated at 88. The latter is designed to receive and discharge the higher of the inputs from 80 and 86 as a demand for more fuel since more fuel will provide greater acceleration. This differential between the desired engine speed and actual engine speed forces 86 on the one hand and the desired temperature schedule and actual temperature schedule forces 80 on the other hand is boosted by an amplifier 90 and again supplied to a solenoid 92. The latter causes the movement of a fluid pressure modulating valve 94 that modulates compressor discharge pressure in a port 96 to an outlet 98 leading to a fluidic metering device 100.

The modulated compressor discharge pressure has a feedback branch 102 leading to the end of the valve. This assures that the modulated pressure can never exceed compressor discharge pressure, and thereby limits the maximum fuel flow to the engine as a function of compressor discharge pressure. By this means, the fuel flow to the engine will be modulated to hold constant the engine rpm for any given foot pedal position and is also modulated to prevent engine temperatures exceeding a maximum desired acceleration temperature. For example, if the engine temperature sensor were to become inoperative, since the logic comparator 88 is calling for the higher of the two input signals, and, therefore, greater and greater fuel flow, without the modulating compressor discharge pressure, the fuel flow would raise the operating temperature to an excessive amount. However, with the construction as shown, since fuel flow can never exceed compressor discharge pressure, excessive turbine temperatures should not occur.

As stated, the modulated compressor discharge pressure is supplied to the control port 104 of a fluidic metering device 100. The opposite control port 106 is connected to atmospheric pressure. The metering device is of a known construction having a normal straight path portion 30 receiving the discharge from the fuel pump. The opposite end 38 of the metering device straight path is connected to a return line to the fuel pump. Alternatively, the metering device contains a path 108 that leads to the engine combustion chamber 22. The fuel is adapted to be deflected from the straight path to the side path 108 to the combustion chamber by the controlled introduction of modulated compressor pressure to the control port 104.

In brief, therefore, it will be seen that for acceleration purposes, depression of the accelerator pedal 82 by the vehicle operator will raise the signal of the function generator 84 to the comparator 86 so that the lower actual speed will provide a differential output to the logic circuit 88. The latter is also receiving an output from the comparator 80 which now is calling for a higher desired acceleration temperature as compared to the actual temperature from the sensor 60. The resultant output signal is supplied to the solenoid 92 which moves the modulating device 94 to increase fuel flow to the combustion chamber by deflecting the fuel flow path in proportion to the error signal from the logic circuit 88. On the other hand, should the operating temperature during the acceleration phase exceed the desired schedule for any particular speed, the higher signal would call for less fuel flow so as to provide less temperature increase. This would be accomplished by the solenoid 92 moving the valve 94 accordingly to decrease the modulated compressure discharge pressure to the fluidic metering device and, therefore, decrease deflection of the fuel flow from the return line 38 to the combustion chamber.

Consider now the control of the compressor inlet guide vanes to provide an engine starting and idle speed control, as well as control of acceleration temperatures. For engine idling purposes, it is desired that the horsepower be low enough so that creep of the vehicle is avoided. However, if the low horsepower is provided by controlling speed, the speed level at idle then becomes so low that the rate of acceleration to a higher speed becomes unsatisfactory. Therefore, it is more desirable for part load operation if the idle speed of the engine could be kept at say 55 percent of normal load, for example, so that quick accelerations from idle can be made when desired.

The adjustable compressor inlet guide vanes provide for just such an operation as described above. Closing down of the nozzle formed by the inlet guide vanes changes the direction of the air flow to provide swirl to the air taken into the compressor. This decreases the torque output of the compressor while only negligibly decreasing the speed of the air, and thereby accomplishes the desired result of maintaining speed at a desired level while decreasing the horsepower to avoid creep.

On the other hand, when it is desired to start the engine, it is desirable that maximum air flow occur. Accordingly, for engine starting purposes, the compressor inlet guide vanes should be moved to an open position. As shown in FIG. 2, the variable angle compressor inlet guide vanes 17 have a common actuator 110 that is connected through a linkage 112 and a ratchet means 114 to the foot or accelerator pedal 82. This provides an opening and closing of the guide vanes modulated as a function of depression or release of the vehicle accelerator pedal. In this case, linkage 112 connected to the guide vanes is adapted to rotate or be rotated by a shaft 116 on which is fixed the two portions 118 and 120 of the ratchet mechanism. The latter in turn are connected to a lever 122 bearing against the underside of the conventional accelerator pedal.

The ratchet mechanism 114 normally is bidirectional in that the two sections 118 and 120 normally remain engaged so that depression of the pedal 82 rotates both units simultaneously to open the guide vanes 17. Release of the pedal will cause the ratchet mechanism to return the guide vanes to a closed position by throttle return spring means not shown.

The ratchet mechanism 114 in this case contains a step face 124 cooperating with the dog element 126 that is connected to the armature 128 of a solenoid 130. The latter is located in an electrical circuit including a pressure switch 132 and a vehicle ignition switch 134. The pressure switch is normally closed. When the ignition switch is closed, solenoid 130 is actuated to move the dog 126 into position to lock the portion 120 of the ratchet mechanism from rotation in a clockwise direction. Therefore, it can be seen that for engine starting purposes, where it is desired to open wide the inlet guide vanes for more airflow, closing of the ignition switch 134 and depression of the vehicle accelerator pedal 82 will rotate the guide vanes 17 to an open position. Release of accelerator pedal 82 will cause a ratcheting of the mechanism due to the dog 126 engaging the step face 124 and prevent return movement of the guide vane linkage 112. Subsequent depression and release of the accelerator pedal, therefore, will not control the movement of the guide vanes.

The pressure switch 132 is designed to open when the engine speed approaches the idle speed level normally desired. When that is attained, the pressure switch opens, de-energizing solenoid 130 and permitting its spring to retract the dog 126. This then permits return of the ratchet mechanism 114 to a normally inoperative state, and allows the return of the guide vanes 17 to their closed position when the accelerator pedal is returned to its idle speed position.

There are instances when the operating temperatures may become excessive at a time when the throttle valve or accelerator pedal has been returned to its idle speed position closing the guide vanes. In this case, it would be desirable to open the guide vanes to provide more airflow and reduce the output temperature. Accordingly, the guide vane linkage includes a variable position stop 136 that is actuated by an electric motor 138 electrically connected to the error signal to amplifier 68 emanating from the differential between the actual temperature 60 and actual speed 66. If the temperature becomes excessive, the motor 138 will move the variable stop 136 to the right, as seen in FIG. 2, to move the compressor inlet guide vane linkage 112 accordingly and open the inlet guide vanes 17. This will reduce the temperature to the desired level and the system will return to normal operation with the motor 138 retracting the variable stop 136 to an equilibrium position.

From the foregoing, it will be seen that the invention provides a low cost control system for a single shaft gas turbine engine that is efficient in operation and consists basically of only three controls to provide all the functions necessary for control during steady state operation, accelerative phases of operation, engine starting and idling, and excessive turbine temperature operations.

While the invention has been illustrated and described in its preferred embodiment, it will be clear to those skilled in the arts to which it pertains that many changes and modifications can be made thereto without departing from the scope of the invention.

I claim:

1. A control system for a single shaft gas turbine engine having a compressor, a turbine and a hydraulic torque converter all fixedly mounted thereon for rotation together, the compressor having variable angle inlet guide vanes to control the airflow therethrough, the converter including variable angle stator vanes to load and unload the shaft as a function of stator vane angle, engine operating temperature sensing means and speed responsive means connected to the shaft, operator controlled speed selection means, and a fuel pump driven by the engine and delivering fuel to the combustion chamber thereof, the control system including, a steady state operating means including an engine speed responsive signal generator developing a force signal schedule that is indicative of the desired engine operating temperature changes for each change in the speed level of the engine so as to not exceed compressor surge and metallurgical temperature limits, and first means sensitive to the difference between desired and actual engine operating temperatures to actuate the stator vanes to proportionately change the load on the shaft to thereby vary the actual operating temperature to the desired level, an acceleration fuel control including, an operator positioned desired speed signal generator, a desired acceleration temperature schedule means, and second means sensitive to the higher of the differences between desired and actual speed signals on the one hand and the desired acceleration and actual engine operating temperatures on the other hand, to vary fuel flow to the engine, and, an engine idling and starting control including regulating means for modulating the angle of the compressor inlet guide vanes as a function of movement of the operator controlled speed selection means, to move the vanes to a closed position at engine idle speed and to an open position at part throttle operation to vary airflow through the engine, and third means to override the regulating means during engine starting to open the guide vanes to permit a greater airflow into the engine.

2. A control system as in claim 1, the acceleration control including a compressor discharge pressure responsive first valve proportioning flow of fuel between the combustion chamber and a return line to the pump to increase flow to the combustion chamber as a function of the increased application of compressor discharge pressure thereto, and means to regulate the flow of compressor discharge pressure to the first valve as a function of the differences of signals to the second means.

3. A control system as in claim 2, the second means including a signal comparator providing a differential output signal to a valve actuator connected to a valve modulating compressor discharge pressure to the first valve.

4. A control system as in claim 2, the first valve comprising a fluidic metering device having a normal path directing fuel from the pump to the return line, and a second switching path directing fuel to the combustion chamber, and means connecting the compressor discharge pressure to a control port of the metering device to deflect the fuel flow from the return line to the combustion chamber in proportion to the compressor discharge pressure level.

5. A control system as in claim 1, the second means comprising a comparator having an output signal changing as a function of the change in the highest of its input signals, a valve actuator energized by the comparator output signal, a fluidic metering device receiving fuel from the fuel pump and having a first normal flow path and a second flow path leading respectively to a return line to the pump and to the combustion chamber, and a control port for switching fuel flow from the first path to the second path, means connecting a modulated compressor discharge pressure to the control port to proportion fuel flow between the paths as a function of the level of the latter pressure, and a modulating valve connected to the actuator and modulating the flow of compressor discharge pressure level to the control port as a function of the second means output signal level to limit fuel flow as a function of compressor discharge pressure level.

6. A control system as in claim 5, including means connecting modulated compressor discharge pressure to act on the modulating valve in opposition to the actuator in a feedback manner to return the valve toward a neutral position.

7. A control system as in claim 1, the override means including ratchet means normally bidirectionally connecting the speed selection means and the compressor inlet guide vanes to move the guide vanes to open and closed positions, and other means rendered operable in response to conditioning of the engine for starting operation to render the ratchet means uni-directional to permit only opening movement of the guide vanes.

8. A control system as in claim 7, including engine pressure sensing means operable upon the attainment of a predetermined engine pressure level indicative of near engine idling speed to render the other means inoperable.

9. A control system as in claim 1, the regulating means including normally inoperable ratchet means normally bidirectionally connecting the operator controlled speed selector means to the compressor inlet guide vanes, dog means normally disengaged from the ratchet means and engaged therewith in response to closure of the engine ignition switch to render the ratchet means operable and lock the ratchet means against rotation in a guide vane closing position direction whereby subsequent movement of the speed selector means moves the guide vanes to an open position, and means responsive to the attainment of approximately an engine idling speed to disable the dog means and again render the ratchet means inoperable and bidirectional in movement.

10. A control system as in claim 9, the last mentioned means comprising a pressure switch normally closing an electrical circuit between the ignition switch and the dog means and openable upon the attainment of a pressure level indicative of near engine idling speed.

11. A control system as in claim 1, including means to override the speed selection means in a guide vane closing direction in response to the attainment of a predetermined engine temperature to move the vanes towards an open position to thereby lower the temperature to the desired level.

12. A control system as in claim 11, including a variable position stop movable in response to the predetermined temperature to move the guide vanes in an opening direction.

* * * * *